United States Patent
Tai et al.

(10) Patent No.: US 7,508,549 B2
(45) Date of Patent: Mar. 24, 2009

(54) METHOD AND APPARATUS FOR MULTI-COLOR PRINTING USING HYBRID DOT-LINE HALFTONE COMPOSITE SCREENS

(75) Inventors: Hwai-Tzuu Tai, Rochester, NY (US); Dmitri Anatolyevich Gusev, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 904 days.

(21) Appl. No.: 10/837,518

(22) Filed: Apr. 30, 2004

(65) Prior Publication Data

US 2005/0243344 A1   Nov. 3, 2005

(51) Int. Cl.
    *H04N 1/405* (2006.01)
(52) U.S. Cl. .............. 358/3.2; 358/3.26; 358/533; 358/536; 358/540; 358/3.21
(58) Field of Classification Search ........... 358/1.9, 358/536, 540, 533, 3.26, 3.2, 3.21, 3.24
    See application file for complete search history.

(56) References Cited

U.S. PATENT DOCUMENTS

| | | |
|---|---|---|
| 4,537,470 A | 8/1985 | Schoppmeyer |
| 4,812,899 A | 3/1989 | Kueppers |
| 4,878,977 A | 11/1989 | Kueppers |
| 5,055,923 A | 10/1991 | Kitagawa et al. |
| 5,067,025 A | 11/1991 | Kitagawa |
| 5,258,849 A | 11/1993 | Tai et al. |
| 5,258,850 A | 11/1993 | Tai |
| 5,734,800 A | 3/1998 | Herbert et al. |
| 5,808,755 A | 9/1998 | Delabastita |
| 5,953,988 A | 9/1999 | Vinck |
| 6,281,924 B1 | 8/2001 | Tsuzuki .............. 347/251 |
| 6,307,645 B1 * | 10/2001 | Mantell et al. ............ 358/1.9 |
| 6,346,993 B1 * | 2/2002 | Curry ..................... 358/1.9 |
| 6,404,508 B1 | 6/2002 | Ota et al. ................. 358/1.9 |
| 6,538,677 B1 | 3/2003 | Thompson et al. |
| 6,608,641 B1 | 8/2003 | Alexandrovich et al. |
| 6,917,443 B1 * | 7/2005 | Wang ..................... 358/1.9 |
| 6,985,256 B2 * | 1/2006 | Cheng et al. ............. 358/1.9 |
| 2002/0089708 A1 | 7/2002 | Cheng et al. ............. 358/534 |
| 2004/0021883 A1 | 2/2004 | Sugizaki |
| 2004/0061879 A1 | 4/2004 | Takano et al. ............ 358/1.9 |

FOREIGN PATENT DOCUMENTS

| | | | |
|---|---|---|---|
| EP | 892549 A2 * | 1/1999 | |
| EP | 1 202 558 A2 | 5/2002 | |
| WO | WO 93/026116 | 12/1993 | |

\* cited by examiner

*Primary Examiner*—King Y Poon
*Assistant Examiner*—Jamares Washington

(57) ABSTRACT

A method and apparatus for generating a multicolor image using halftone screens employs a dot structure dot growth pattern for one or more of the colors and a line structure dot growth pattern for at least two or more of the other colors.

24 Claims, 10 Drawing Sheets

```
          ┌─32
          ↙
  7    6    4    2

3    1    5    8

4    2    7    6

5    8    3    1
```

METHOD AND APPARATUS FOR MULTI-COLOR PRINTING USING HYBRID DOT-LINE HALFTONE COMPOSITE SCREENS

CROSS-REFERENCE TO RELATED APPLICATION

This application is related to U.S. application Ser. No. 10/836,762 filed on even date herewith in the names of Tai et al. and entitled, METHOD AND APPARATUS FOR MULTI-COLOR PRINTING USING A ROSETTE OR DIAMOND HALFTONE SCREEN FOR ONE OR MORE OF THE COLORS, the contents of which are incorporated herein by reference.

BACKGROUND OF THE INVENTION

1. Field of the Invention

The present invention relates to the field of digital encoding of pictorial information for use in forming color reproductions on display or printing systems.

2. Description Relative to the Prior Art

With the advent of printing using digital technology, images may be printed, by rendering the image into a set of pixels. In pure binary printers, the pixel is either on (black) or off (white). Such techniques are well suited to reproducing text because the sizes of the individual pixels that make up the symbols are much smaller than the symbols. Thus, the human eye sees the text as a continuous image even though it is a collection of closely spaced dots.

However, most binary print engines and particularly electrophotographic print engines do not provide acceptable levels of gray for other images, such as photographs. Those skilled in the art have used halftone dots to emulate grayscale for reproducing images with continuous tones. One reason for this is that the particles used for forming the printed dots may be larger than is desirable even if the printing system were suited to printing very small binary pixels.

In the area of digital printing (the term "printing" is used to encompass both printing and displaying throughout), gray level has been achieved in a number of different ways. The representation of the intensity, i.e., the gray level, of a color by binary displays and printers has been the object of a variety of algorithms. Binary displays and printers are capable of making a mark, usually in the form of a dot, of a given, uniform size and at a specified resolution in marks per unit length, typically dots per inch. It has been well known to place the marks according to a variety of geometrical patterns such that a group of marks when seen by the eye give a rendition of an intermediate color tone between the color of the background (usually white paper stock) and total coverage, or solid density. The effect is such that a group of dots and dot-less blank spots, when seen by the eye, is a rendition of an intermediate color tone or density between the color of the initial paper stock, usually white, and total ink coverage, or solid density halftone dot. It is conventional to arrange the dots in rows, where the distance between rows is known as line spacing, and determines the number of lines per inch (lpi). In the ensuing paragraphs, discussions will be made in terms of white paper stock; it is understood that white paper stock is used as an illustration and not as a limitation of the invention and that other media may be used such as plastics, textiles, coated papers, metals, wood, edible articles, etc.

Continuous tone images contain an apparent continuum of gray levels. Some scenes, when viewed by humans, may require more than two hundred and fifty six discrete gray levels for each color to give the appearance of a continuum of gray levels from one shade to another. Halftone pictorial or graphical images lower the high contrast between the paper stock and toned image and thereby create a more visually pleasing image. As an approximation to continuous tone images, pictorial imagery has been represented via binary halftone technologies. In order to record or display halftone images one picture element of the recording or display surface consists of a j×k matrix or cell of sub-elements where j and k are positive integers. A halftone image is reproduced by printing the respective sub-elements (pixels or pels) or leaving them blank, in other words, by suitably distributing the printed marks within each cell.

Another method of producing gray levels, is provided by gray level printing. In such a method, each pixel has the capability to render several different dot sizes. In certain electrophotographic printing systems, for example, the dot size for a pixel is a function of the exposure time provided an LED element corresponding to that pixel. The longer the exposure time, the more toner is attracted to that particular pixel.

There are two major concerns in rendering a continuous tone image for printing: (1) the resolution of image details, and (2) the reproduction of gray scales. These two fundamental factors compete with each other in a binary representation scheme. The more gray levels that are rendered, the larger is a halftone cell. Consequently, coarse halftone line screens are provided, with the attendant poor image appearance. Hence, compromises made in rendering between the selection of line resolution in gray scale and binary halftone printing. However, with gray level halftone printing, one can satisfy both resolution and gray level requirements. In gray level printing, the same number of addressable dots are present, and there is attached a choice of dot sizes from one dot size of 1 bit/pixel to for example 255 different dot-sizes of 8 bits/pixel. Although providing higher image quality with respect to line resolution and tone scales, gray level halftone presents its own dot rendering issues.

A number of different dot layouts are possible to build gray level dots from a cell template. These gray level dots are the digital representation of the gray level screening, and must be realized through a printing process. It is desirable in gray level screening to layout the dots with the printing process characteristics built into it such that the appearance of the dots are pleasing to the eye: less grainy, stable, less artifacts, less texture (i.e., visible screen and its microstructure).

An example of a line screen designed for gray scale rendering is disclosed in U.S. Pat. No. 5,258,850. The arrangement of pixels within a halftone cell is such that growth within a cell to represent increases in density is accomplished through arranging the pixels along lines of growth. Another example of a halftone cell is that shown in U.S. Pat. No. 5,258,849, which features growth of density within a halftone cell by gradual enlargement about a central area within the cell. The halftone cells disclosed in the above two patents are notable in that the pixels we need within each cell may vary in density. This substantially increases the number of gray levels that may be represented by the overall halftone cell from that where the pixels can only be rendered as a binary representation (either black or white with no distinction regarding size). The combination of cells represents a halftone screen.

Color printing on halftone printers involves the formation of color separations as halftone screens for each color, which is to be used to form a color image. The halftone screens are laid down on a predetermined overlapping relationship to each other, which results in generation of the desired color image. A well-known problem when overlapping two or more halftone screens is the possibility of developing a moiré pattern or other form of interference, when the screens are not properly positioned. To avoid the moiré or other undesirable patterns, precise angle combinations of the screens are required. It is known that increasing the difference in angle of two overlaid dot screens will result in a smaller pattern, making the pattern less apparent. However, the prior art teaches, see for example U.S. Pat. No. 6,307,645, the largest possible angle difference between two overlaid screens should be no more than 45° because a 90° screen is essentially the same as 0°, just as a 135° screen is the same as a 45° screen even in the context of attempting to reduce moiré with asymmetrical dots.

In color image printing it has been common practice to use at least three process colors and in more cases three process colors and black. In the case of four-color printing the printing industry has generated a standardized combination of four halftone angles. In particular and with reference to FIG. 1, the cyan halftone screen is located at 15°, the black halftone screen at 45°, the magenta halftone screen at 75° and the yellow halftone screen at 0°. Since yellow is the lightest and least noticeable color, it can be set at 0°, even though 0° is a highly noticeable angle, and that is only 15° from the nearest neighbor. In some embodiments, the cyan halftone screen is known to be set at 105°, however, with symmetrical dots this is substantially the same as 15°, and the prior art recognizes that even with asymmetrical dots it does not make a large difference.

When the four process colors using the above halftone screen angle combinations are overlaid, the resulting moiré or other interference patterns are as small as possible. A visually pleasing rosette structure is formed when the individual dots grains are oriented 30° apart. The traditional graphics art printing has been made using this 15°/45°/75° angle screen design to form a balanced rosette structure. In the CMYK four-color printing process, the yellow screen is usually designed at 0° or 45°. However, the moiré pattern resulting from the interaction between the yellow screen and the other three individual screens due to miss-registration is not as visually pleasing as a 30° moiré pattern (rosette structure). Yellow is a light color, so this additional moiré is usually acceptable and not very noticeable in most CMYK four-color printing systems. However, careful examination of prints shows that this yellow moiré pattern can be seen in certain composite colors. Where additional colors are used such as in a hi-fi color (for example, a five-color) printing system, there is a need to design a fifth screen on top of the original well-balanced CMYK screen set. This is particularly true where the fifth color screen is blue, the complementary color of yellow, and the blue color screen is placed at the same screen angle and screen frequency as the yellow color screen. The unpleasant moiré, which was not noticeable in the yellow color, will now show up in the blue color.

It is thus known that many color printing systems will include five or more printing units using different color colorants. Attempting to incorporate these additional colors is noted to be difficult, especially if each color must have a halftone screen with a unique halftone angle. Particularly, once there are more than four screens with attendant screen angles, which must be laid down, the patterning problems discussed above, are greatly increased. It would thus be desirable to provide color screen sets for printing which minimize the unpleasant moiré patterns formed including those caused by the interactions of the yellow screen.

SUMMARY OF THE INVENTION

The foregoing objects are realized by the present invention, which provides an apparatus and method for the generation of halftone images with reduced image artifacts and increased number of gray levels. In accordance with a first aspect of the invention there is provided an apparatus for configuring image information for printing of an image having at least three different colors, comprising a first halftone screen generator for generating information representing a first color separation image of the image by generating first halftone cells at a first predetermined halftone screen angle wherein pixels within the first halftone cell are oriented in a line structure with increasing cell density from first halftone cell to first halftone cell being identified by stronger line structures; a second halftone screen generator for generating information representing a second color separation image of the image by generating second halftone cells at a second predetermined halftone screen angle different from the first halftone screen angle and wherein pixels within the second halftone cell are represented in a line structure with increasing cell density from second halftone cell to second halftone cell being identified by stronger line structures, the line structures formed in the second halftone cells being at a different angle than the line structures formed in the first halftone cells; and a third halftone screen generator for generating information representing a third color separation image of the image by generating third halftone cells at a third predetermined halftone screen angle wherein pixels within a third halftone cell are represented by dots with increasing cell density from third halftone cell to third halftone cell being identified by stronger dot structures, the dot structures of the third halftone cells image being ordered along a series of parallel third lines and the series of parallel third lines being at a different angle than that of the line structures formed in the first and second halftone cells.

In accordance with a second aspect of the invention there is provided a method for configuring image information for printing of an image having at least three different colors, comprising generating information representing a first color separation image of the image by generating first halftone cells at a first predetermined halftone screen angle wherein pixels within the first halftone cell are oriented in a line structure with increasing cell density from first halftone cell to first halftone cell being identified by stronger line structures; generating information representing a second color separation image of the image by generating second halftone cells at a second predetermined halftone screen angle different from the first halftone screen angle and wherein pixels within the second halftone cell are represented in a line structure with increasing cell density from second halftone cell to second halftone cell being identified by stronger line structures, the line structures formed in the second halftone cells being at a different angle than the line structures formed in the first halftone cells; and generating information representing a third color separation image of the image by generating third halftone cells at a third predetermined halftone screen angle wherein pixels within a third halftone cell are represented by dots in accordance with a dot structure growth pattern with increasing cell density from third halftone cell to third halftone cell being identified by stronger dot structures, the dot structures of the third halftone cells image being ordered along a series of parallel third lines and the series of parallel third lines being at a different angle than that of the line structures formed in the first and second halftone cells.

In accordance with a third aspect of the invention there is provided apparatus for configuring image information for printing of an image having at least three different colors, comprising a screen generator or generators for generating halftone screen color separation image data for each of the at least three different colors, the screen generator or generators generating image data in the form of halftone screens representative of the image at predetermined respective screen angles wherein for each of at least two of the three colors a first type of dot growth is pattern is provided and is operational to generate halftone cells of different density and for the third of the three colors a second type of dot growth pattern is provided which is different from the first type of dot growth pattern used commonly for the said at least two of the three colors, wherein the first type of growth pattern is selected from the group consisting of the dot structure dot growth pattern and the line structure dot growth pattern and the second type of growth pattern is selected from the group consisting of the dot structure dot growth pattern and the line structure dot growth pattern and further wherein the respective screen angles for the at least two of the three colors and for the third of the three colors are all different from each other.

In accordance with a fourth aspect of the invention there is provided a method for configuring image information for printing of an image having at least three different colors, comprising generating halftone screen color separation image data for each of the at least three different colors in the form of halftone screens representative of the image at predetermined respective screen angles wherein for each of at least two of the three colors a first type of dot growth is pattern is provided and is operational to generate halftone cells of different density and for the third of the three colors a second type of dot growth pattern is provided which is different from the first type of dot growth pattern used commonly for the said at least two of the three colors, wherein the first type of growth pattern is selected from the group consisting of the dot structure dot growth pattern and the line structure dot growth pattern and the second type of growth pattern is selected from the group consisting of the dot structure dot growth pattern and the line structure dot growth pattern and further wherein the respective screen angles for the at least two of the three colors and for the third of the three colors are all different from each other.

In accordance with a fifth aspect of the invention there is provided a method for generating a multicolor image using halftone screens comprising forming halftone dots using a dot structure dot growth pattern for the halftone cells of one or more of the colors; and forming halftone lines using a line structure dot growth pattern for the halftone cells of at least two of the other colors.

Other objects, advantages, and novel features of the present invention will become more apparent from the following detailed description of the invention when considered in conjunction with the accompanying drawings.

DETAILED DESCRIPTION OF THE PREFERRED EMBODIMENTS

Figure 2:
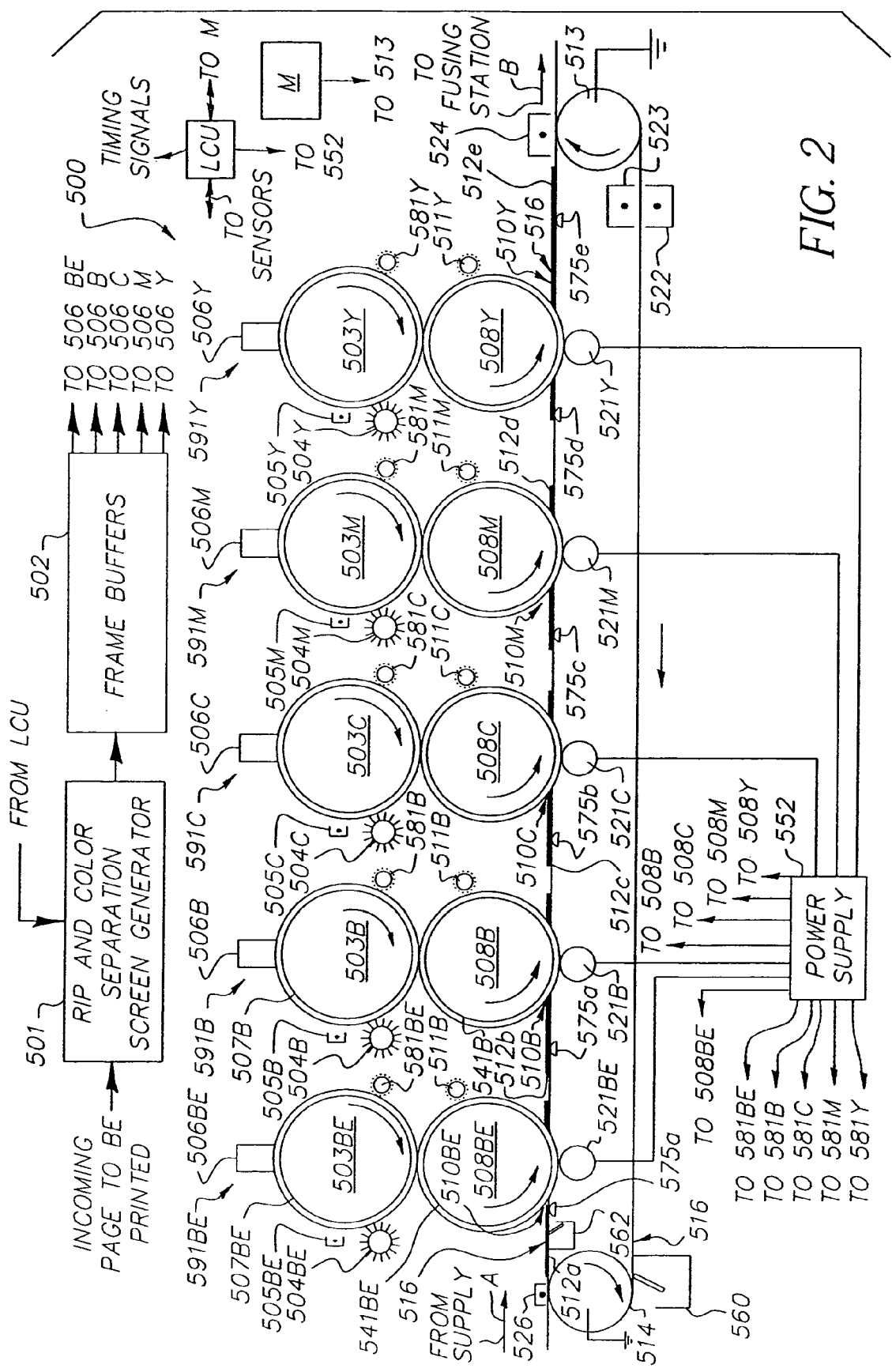
FIG. 2 is a schematic of an electrophotographic print engine that may be used in accordance with the invention to generate multicolor prints.

FIG. 2 is an elevational view showing the essential portions of an electrophotographic engine suitable for printing of full-color images and incorporating the improvements of the invention. Although one embodiment of the invention involves printing using an electrophotographic engine having repeating sets of single color image producing stations and arranged in a so-called tandem arrangement other electrostatographic color reproduction apparatus can make use of the invention as well as other types of color printing systems including inkjet, lithography, etc.

With reference now to FIG. 2 there is shown a printer apparatus 500 having a number of tandemly arranged electrostatographic image forming modules. Although five modules are shown it will be understood that the invention is applicable to a printer apparatus for printing at least three more colors. Each module of the printer includes a plurality of electrophotographic imaging subsystems for producing a single color toned image. Included in each imaging subsystem is a charging subsystem for charging a photoconductive imaging member, an exposure system for imagewise exposing a photoconductive imaging member to form a latent color separation image in the respective color, a development subsystem for toning the imagewise exposed photoconductive imaging member with toner of the respective color, an intermediate transfer subsystem for transferring the respective color separation image from the photoconductive imaging member to an intermediate transfer member and from the intermediate transfer member to a receiver member which receives the respective toned color separation images in superposition to form a composite multicolor image. Subsequent to transfer of the respective color separation images from each of the respective subsystems the receiver member is transferred to a fusing subsystem to fuse the multicolor toner image to the receiver member. Further details regarding the printer 500 are also provided in U.S. Pat. No. 6,608,641, the contents of which are incorporated herein by reference.

The five exemplary color modules of printer apparatus 500 are for preferably forming black, cyan, magenta, yellow, and blue color toner separation images. Although blue is illustrated and preferred as the fifth color it will be understood that the fifth color may be other dominant colors such as red or green or orange or violet or that the number of the modules may be increased to print more colors than five. Elements in FIG. 2 that are similar from module to module have similar reference numerals with a suffix of B, C, M, Y, and BE referring to a color module to which it is respectively associated; i.e. black (B), cyan (C), magenta (M), yellow (Y), and blue (BE). Each module (591B, 591C, 591M, 591Y, and 591BE) is of similar construction except that as shown one receiver transport web (RTW) 516 in the form of an endless belt operates with all the modules and the receiver member is transported by the RTW 516 from module to module. Receiver members are supplied from a paper supply unit, thereafter preferably passing through a paper conditioning unit (not shown) before entering the first module in the direction as indicated by arrow A. The receiver members are adhered to RTW 516 during passage through the modules, either electrostatically or by mechanical devices such as grippers, as is well known. Preferably, receiver members are electrostatically adhered to RTW 516 by depositing electrostatic charges from a charging device, such as for example by using a tack-down corona charger 526. Five receiver members or sheets 512a, 512b, 512c, 512d, and 512e are shown (simultaneously) receiving images from modules 591BE, 591B, 591C, 591M, and 591Y. It will be understood as noted above that each receiver member may receive one color image from each module and that in this example up to five-color images can be received by each receiver member. The movements of the receiver member with the RTW 516 is such that each color image transferred to the receiver member at the transfer nip 510B, 510C, 510M, 510Y, and 510BE of each module is a transfer that is registered with the previous color transfer so that a five-color image formed on the receiver member has the colors in registered superposed relationship on the transferee surface of the receiver member. The receiver members are then serially detacked from RTW 516 and sent in a direction indicated by arrow B to a fusing station (not shown) to fuse or fix the dry toner images to the receiver member. The RTW is reconditioned for reuse by providing charge to both surfaces using, for example, opposed corona chargers 522, 523 which neutralize charge on the two surfaces of the RTW.

Each color module includes a primary image-forming member, for example a drum or primary image-forming roller (PIFR) labeled 503B, 503C, 503M, 503Y, and 503BE respectively. Each PIFR 503B, 503C, 503M, 503Y, and 503BE has a respective photoconductive surface structure 507B, 507C, 507M, 507Y, and 507BE having one or more layers, upon which a pigmented marking particle image or a series of different ones of such images is formed (individual layers of PIFRs are not shown). In order to form toned images, the outer surface of the PIFR is uniformly charged by a primary charger such as a corona charging device 505B, 505C, 505M, 505Y, and 505BE respectively, or by other suitable charger such as a roller charger, a brush charger, etc. The uniformly charged surface is preferably exposed by a respective electronic image writer, which exposure device is preferably an LED or other electro-optical exposure device, for example, a laser to selectively alter the charge on the surface of the PIFR. The exposure device creates an electrostatic image corresponding to an image to be reproduced or generated. The electrostatic image is developed, preferably using the well-known discharged area development technique, by application of pigmented marking particles to the latent image bearing photoconductive drum by development station 581B, 581C, 581M, 581Y, and 581BE respectively, which development station preferably employs so-called "SPD" (Small Particle Development) developers. Each of development stations 581B, 581C, 581M, 581Y, and 581BE is respectively electrically biased by a suitable respective voltage to develop the respective latent image, which voltage may be supplied by a power supply, e.g., power supply 552, or by individual power supplies (not illustrated). The respective developer includes toner marking particles and magnetic carrier particles. Each development station has a particular color of pigmented toner marking particles associated respectively therewith for toning. Thus, each module creates a series of different color marking particle images on the respective photographic drum. In lieu of a photoconductive drum, which is preferred, a photoconductive belt may be used. Alternatively, the image may be created by an electrostatic charger that forms respective pixels of charge on an insulating surface directly in response to image information.

Each marking particle image formed on a respective PIFR is transferred to a compliant surface of a respective secondary or intermediate image transfer member, for example an intermediate transfer Roller (ITR) labeled 508B, 508C, 508M, 508Y, and 508BE respectively. After transfer, the residual toner image is cleaned from the surface of the photoconductive drum by a suitable cleaning device 504B, 504C, 504M, 504Y, and 504BE, respectively, so as to prepare the surface for reuse for forming subsequent toner images.

A logic and control unit (LCU) provides various control signals that control movement of the various members and the timing thereof as well as the appropriate electrical biases for accommodating the various transfers of the respective toner images. Timing signals are also provided to a motor, M, which drives a drive roller 513 that drives the RTW 516. The RTW in turn may be used to drive the other components and/or other drivers may be used to control movement of the rollers in the respective modules. Image data for writing by the printer apparatus 500 may be processed by a raster image processor (RIP) 501 which may include a color separations screen generator or generators. The term "generator" or "generators" are used interchangeably herein since a single device may operate serially and be programmed or adjusted to operate differently for each of the different screens. The output of the RIP may be stored in a frame or line buffers 502 for transmission of the color separation print data to each of the respective LED writers, 506BE, 506B, 506C, 506M, and 506Y. The RIP and/or color separations screen generator may be a part of the printer apparatus or remote therefrom. Image data processed by the RIP may be obtained from a color document scanner or a digital camera or generated by a computer or from a memory or network. The RIP may perform image processing processes including color correction, etc. in order to obtain the desired color print. Color image data is separated into the respective colors and converted by the RIP to halftone dot image data in the respective color using threshold matrices, which comprise desired screen angles and screen rulings. The RIP may be a suitably programmed computer and/or logic devices and is adapted to employ stored or generated threshold matrices and templates for processing separated color image data into rendered image data in the form of halftone information suitable for printing.

Figure 1:
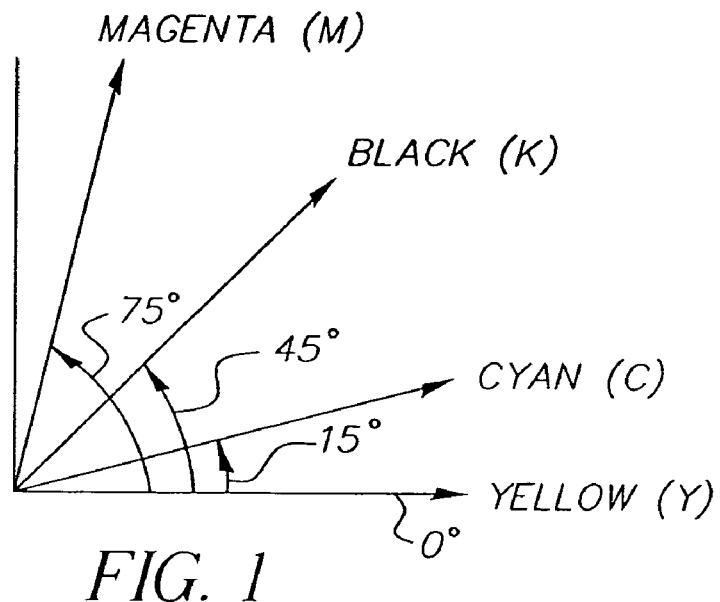
FIG. 1 is a diagram illustrating a representation of halftone screen angles in a four-color printing system as known in the prior art.
Figure 3:
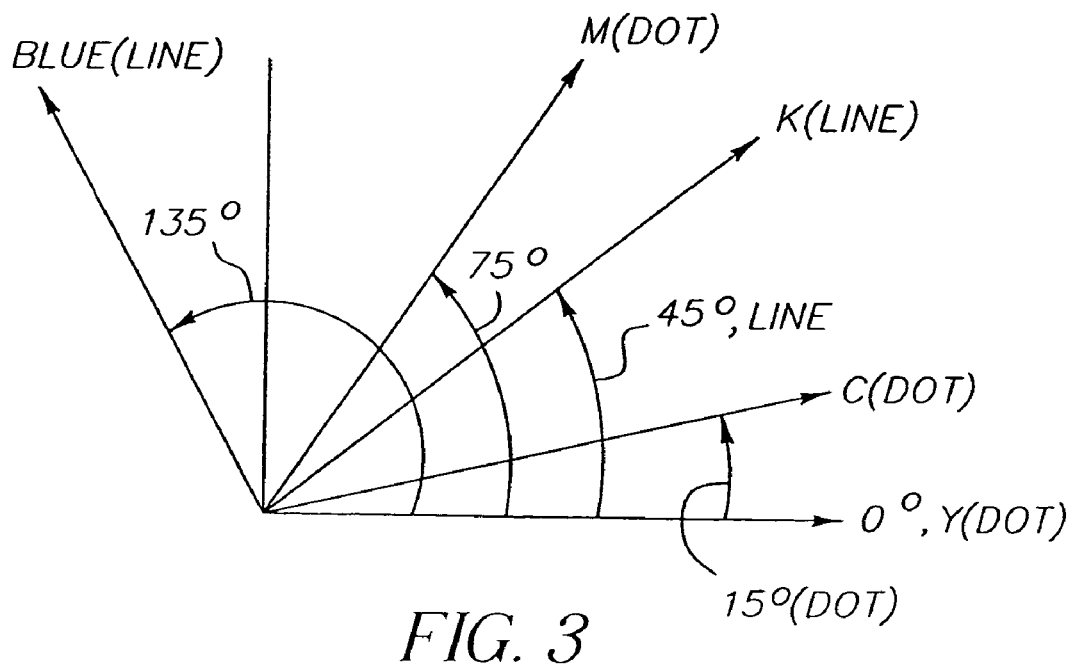
FIG. 3 is a diagram illustrating a representation of halftone screen angles and dot growth pattern types (dot or line) in a five color printing system in accordance with a first embodiment of the invention.

With reference now to FIG. 3 and assuming a print job request is for a photographic type of image (as opposed to a text image) each module of printer apparatus 500 will be caused to generate a halftone screened image in the respective separation color and wherein the cells of the halftone screen are oriented at the angle indicated in FIG. 3. In addition to indicating the respective angle of the screen FIG. 3 also identifies with each color the respective type of dot pattern structure, which is associated with that color. For example, the yellow halftone screen is indicated as being at 0° and a dot structure dot growth pattern is the type of dots that are created at the pixel locations within a halftone cell forming part of the yellow color separation halftone screen. An example of such a dot structure dot growth pattern is a full-type dot structure illustrated in FIGS. 4, 5, and 6. The cyan color separation component halftone screen is directed at an angle of 15° to that of the yellow color halftone separation screen. The cyan color image is produced in accordance with a dot type structure similar to that used for yellow. The black color separation component halftone screen is directed at an angle of 45° to that of the yellow color halftone separation screen. Note, that screen angles are nominal values and might vary ±0.5° from the recited number. The dot structure used to form the image in the black color is that of the line structure dot growth pattern type as will be more fully described with regard to FIG. 7. The magenta color separation component halftone screen is directed at an angle of 75° to that of the yellow color halftone separation screen. The magenta color image is produced in accordance with a dot structure dot growth pattern type similar to that used for yellow. The blue color separation component halftone screen is directed at an angle of 135° to that of the yellow color halftone separation screen. The blue color image is produced in accordance with a line structure dot growth pattern type similar to that used for black. It will be noted that the blue color separation halftone screen is directed at an angle of 90° to that of the black color separation halftone screen. Because each of the screens, blue and black, use the same type of growth pattern for reproducing the respective dots on the respective color separation images that the line structures of these dots will tend to be perpendicular to each other. That is the line structures of dots in the blue color separation image will tend to be perpendicular to the line structures of dots in the black color separation image. It has been found that such will greatly diminish the generation of moiré artifacts. The yellow, cyan and magenta halftone screens are at the standard angles but employ a dot structure dot growth pattern rather than a line structure dot growth pattern and moiré artifacts are reduced because of adhering to the standard angles for these respective colors. In the embodiment of FIG. 3 the line frequencies for the five screen patterns are about the same nominal screen frequency for example about 155 lines per inch. Alternatively, each may be about 133 lines per inch. Although it is known in the prior art to use, in a four-color tandem printer, screen patterns wherein a first of two color separation images have their respective halftone screen patterns oriented at 90° to each other and a second of two color separation images that have their respective halftone screen patterns oriented at 90° to each other, all four of such screens employed a line type growth pattern. Thus where a fifth color halftone screen is required to be used the creation of moiré artifacts would be problematic where all halftone screen patterns employed the line structure dot growth pattern.

Figure 4:
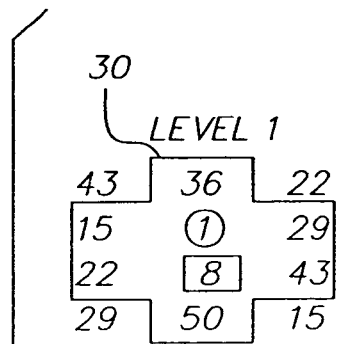
FIG. 4 illustrates an exemplary three-bit gray halftone dot layouts according to a full dot type embodiment as known in the prior art and which may be used in accordance with the invention.
Figures 5, 6:
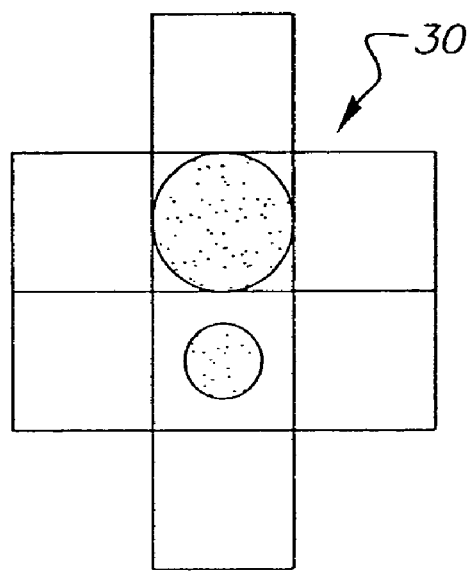
FIG. 5 illustrates a halftone cell with dots that have been formed in accordance with the full dot type of growth pattern of FIG. 4.
FIG. 6 illustrates an exemplary halftone dot mask used for growing the full dot type dot of FIG. 4.
Figure 7:
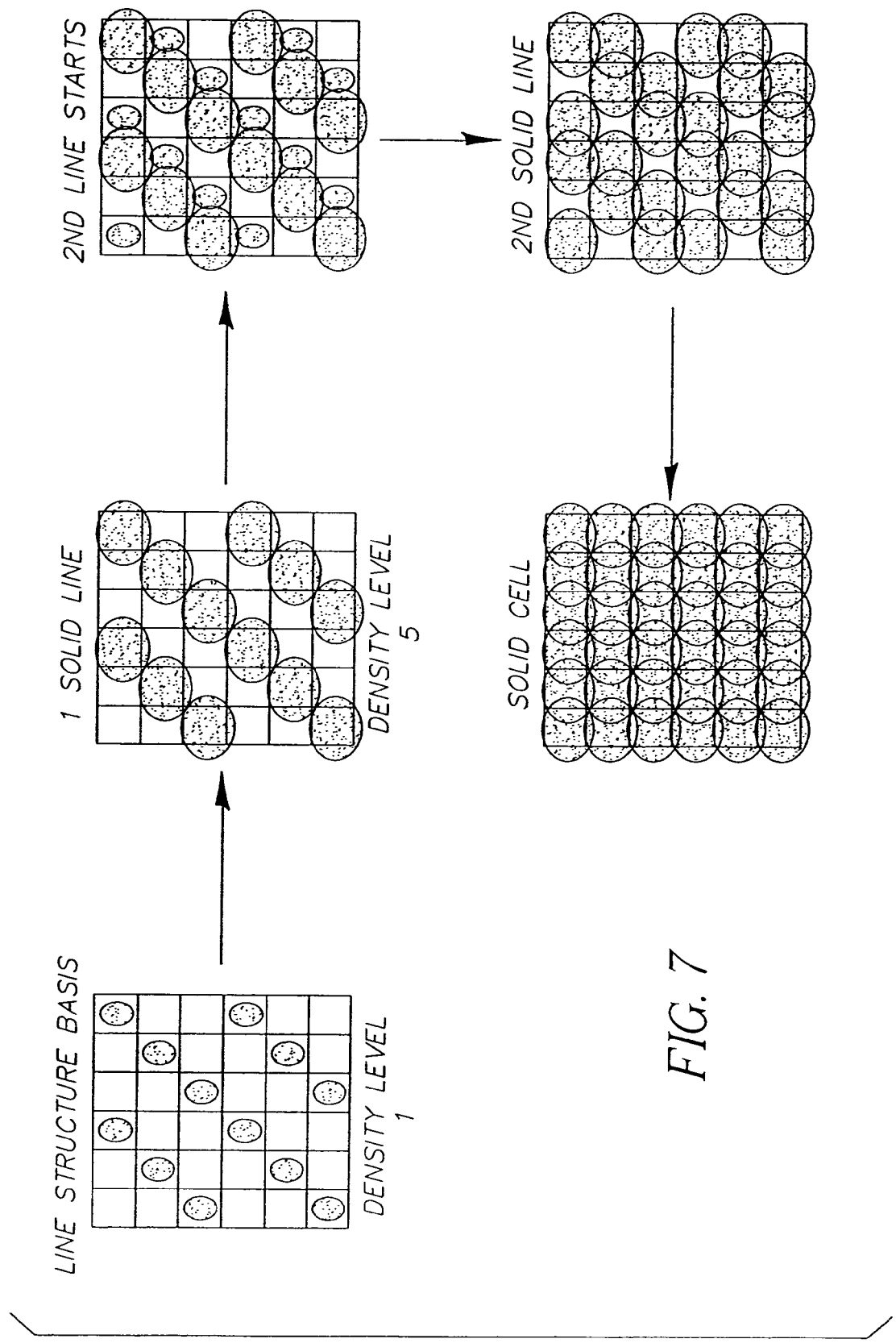
FIG. 7 is a graphic illustration of the building up within a halftone cell in accordance with a line structure type dot growth pattern as known in the prior art and which may be used in accordance with the invention.

With reference now to FIGS. 4-6 description will be provided of a dot structure dot growth pattern, which is distinguished herein from the line structure dot growth pattern description of which will be provided hereafter with regard to discussion of FIG. 7. It should be understood that while the preferred embodiments described herein utilize gray level printheads that are adapted to print gray level dots at each pixel location that the invention regarding the use of various screen angles and dot types are also suited for binary printheads that can place either a dot or no dot at a particular pixel location in a halftone cell. As noted above the pixel locations are grouped into cells having cell gray levels. The dots of a cell are formed such that for each increase in cell gray level, a dot at, at least one of the pixels in the cell, the core pixel, forms to a larger dot size (or dot density). In an example of one type of growth pattern, the dots are sequentially formed at the pixels in the cell in a pre-defined order such that at the lower cell gray levels a dot is formed at a first or core pixel location within the cell and this dot is increased in size (or density) with desired increases in cell density until a maximum dot size is reached before beginning the formation of a dot at an adjacent pixel location within the cell. Thereafter for increasing cell gray levels the dot size is increased at this adjacent pixel location until a maximum dot size is reached at the pixel location. Additional increases in cell density are made similarly with buildup of dots using adjacent pixel locations so that dot growth is from a center or core pixel location gradually outwardly and surrounding the central pixel location.

Alternatively, the growth pattern for the dots of the halftone cell may be a "partial dot" dot structure dot growth pattern also described in U.S. Pat. No. 5,258,849, the contents of which are incorporated herein by reference.

In lieu of the "full dot" growth pattern and the "partial dot" growth pattern just described as well as described in U.S. Pat. No. 5,258,849, the growth pattern may also be that which is known as a "mixed dot" dot structure dot growth pattern wherein growth of the dot at a core pixel location is to a predetermined level less than a maximum before commencing growth at one more adjacent pixel locations about the core pixel. Subsequent growth is by additions to the core pixel as well as to the one or more adjacent pixel locations.

With reference to FIG. 4 there is illustrated an example of a 3-bits/pixel gray halftone dot layout for a full dot type growth pattern. Also illustrated are seven different pixel dot sizes corresponding to the sizes that each individual pixel dot can obtain. There are 57 possible gray levels for the exemplary eight-element cell 30 shown here. An example of the formation of the cell that is a gray level 12 will now be given.

The pixel circled in level one, reference numeral 1, is formed to dot size 1 in level 1. Only one cell will be described, although the pixels in other cells will be changed according to the same layout or growth pattern as shown in FIG. 4. The dot at this pixel grows larger and larger as cell gray levels increase from level 1 to level 2 all the way to cell gray level 7. One can see that the circled pixel increases in value from pixel size (or density) 1 to 7 as the cell gray levels increase. If the desired gray level for the cell 30 is 7, then the formation of dots would be completed once the circled pixel has reached the dot size of 7. In this example, however, the gray level for the cell 30 is desired to be 12. At gray level 7, the circled pixel has reached its maximum dot size, so that a dot at another pixel location in the cell must now start forming. This dot starts forming at an adjacent pixel indicated with a square around it in level 1, with the numeral 8.

The dot formation process continues, with the dot at the second pixel growing larger and larger as the levels again increase from level 1 to level 5. The formation process stops at level 5, since the pixel has now reached the value of 12. The halftone cell 30 now contains, as seen in FIG. 5, a dot of dot size 7, and a dot of dot size 5. The extension of this formation process to 57 gray levels is easy to see from this example. Although this example is illustrated with a printer that forms dots in accordance with 3 bits/pixel the invention is suited for use with any gray level printhead that can form pixels at 2 bits/pixel or more as well as with binary printheads wherein the dot growth pattern is around a central or core pixel location.

The full dot type process thus involves forming dots at the highest priority pixels to their maximum allowable dot size before beginning the formation of the dots for the next highest priority pixels. An exemplary halftone dot mask 32 with pixel priorities indicated is shown in FIG. 6. Different matrix sizes, cell shapes, and priorities can be used for the cells than that illustrated in FIG. 4. Halftone cells of about 4×4 pixels are known and may be used it being understood that the average for a cell need not be a whole number.

In the electrophotographic process, the full dot type formation process is favored because it forms stable dots and exhibits less granularity (halftone printing noise). The partial dot type is known to carry more information detail than full dot type but at the cost of less stable dots in the electrophotographic process. The mixed dot type combines the merits of both the full dot and the partial dot types in gray level halftoning. The above description of the 3-bits/pixel printhead case may readily be extended to higher gray levels. In an example of a 4-bits/pixel printhead each pixel location in the cell may have gray levels from 0 to 15. Also, in an example of a 8-bits/pixel printhead each pixel location in the cell may have gray levels from 0 to 255 and the resolution of the printer for printing pixels may be 300 dpi or greater, the example of FIG. 2 being a 600 dpi printer.

With reference now to FIG. 7 and with further reference to U.S. Pat. No. 5,258,850 there is shown a halftone cell wherein the growth pattern of the dots within the cell is development or creation along a line or lines as opposed to growing of dots about a central or core dot. In the line structure dot growth pattern for lower values of cell density, for example from cell density level 1 to cell density 5, all the pixel locations indicated as having a dot are exposed to form a line of dots are a series of dot lines (three dot lines are shown in the FIG. 7. As the lines become solid dot lines due to overlap of adjacent dots further increases in cell density are produced by forming secondary lines adjacent each of the solid lines as shown in the FIG. 7. Thus it can be seen that the line structure dot growth pattern emphasizes creation of stable line structures as opposed to the full or partial dot or mixed type growth structure, which emphasizes stable dot growth.

Figure 8:
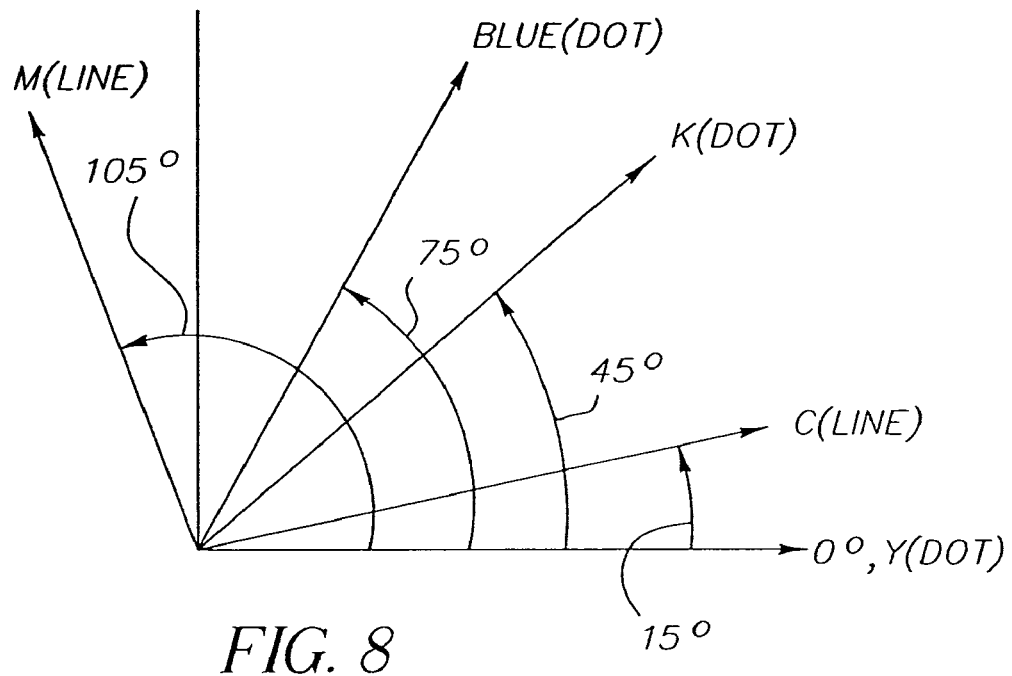
FIG. 8 is a diagram illustrating a representation of halftone screen angles and dot growth pattern types (dot or line) in a five color printing system in accordance with a second embodiment of the invention.

With reference now to FIG. 8 there is illustrated a second embodiment of the invention. In this embodiment the blue, black and yellow halftone screens feature a dot structure dot growth pattern with the screen angles being respectively 75°, 45°, and 0°. The magenta and cyan halftone screens are situated perpendicular to each other with the cyan halftone screen being at 15° and the magenta halftone screen being at 105°. Both the magenta and cyan halftone screens feature a line structure dot growth pattern within each cell and thus the patterns of the lines created within the halftone cells of the magenta screen will be perpendicular to the lines created within the halftone cells of the cyan screen. Therefore, moiré artifacts also tend to be reduced and less apparent for this screen system because the halftone screens employing the dot structure dot growth pattern are between 30° and 45° apart and the halftone screens employing the line structure dot growth pattern are 90° apart.

Figure 9:
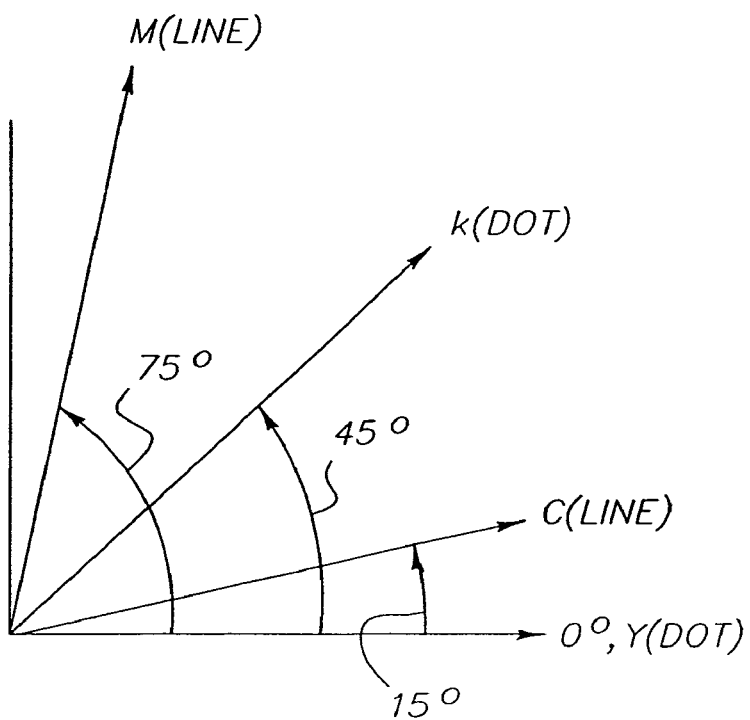
FIG. 9 is a diagram illustrating a representation of halftone screen angles and dot growth pattern types (dot or line) in a four color printing system in accordance with a third embodiment of the invention.
Figure 10:
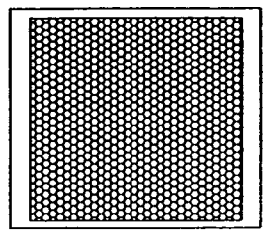
FIG. 10 is an illustration of a diamond screen structure formed by two color separation images each having a line structure dot growth pattern and wherein the line structures are at an angle of 60° to each other.
Figure 11:
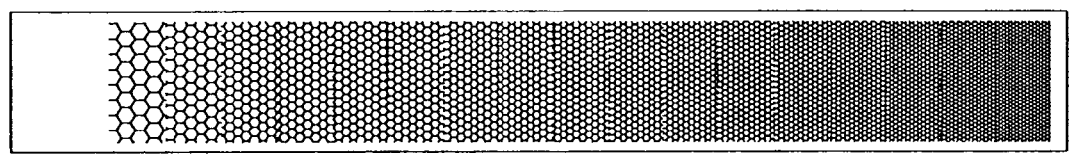
FIG. 11 is an illustration of a density ramp of the two color separation images that feature the diamond structure of FIG. 10.

With reference now to FIG. 9 there is illustrated a third embodiment of the invention. In this embodiment there are only four primary colors cyan, magenta, yellow and black and each has an associated halftone screen. The yellow, cyan, black and magenta halftone screens are situated at the known angles respectively of 0° (or 45°), 15°, 45° and 75°. This embodiment differs from the prior art in that some of the halftone screens, for example yellow and black, are formed with a dot structure dot growth pattern and others, such as for example cyan and magenta, feature a line structure dot growth pattern. In this example the cyan and magenta halftone screens are provided with line structure screens so that the two directions of these lines are separated by a 60° angle and form a "double-line" screen, the white holes of which have a diamond shape, see in this regard the diamond screen pattern shown in FIG. 10. In FIG. 11 there is illustrated a density ramp of the combined cyan and magenta screens with the diamond structure. The halftone screen system of FIG. 9 lends itself to extension to a hi-fi five-color printing while minimizing unpleasant moiré patterns.

Figure 12A:
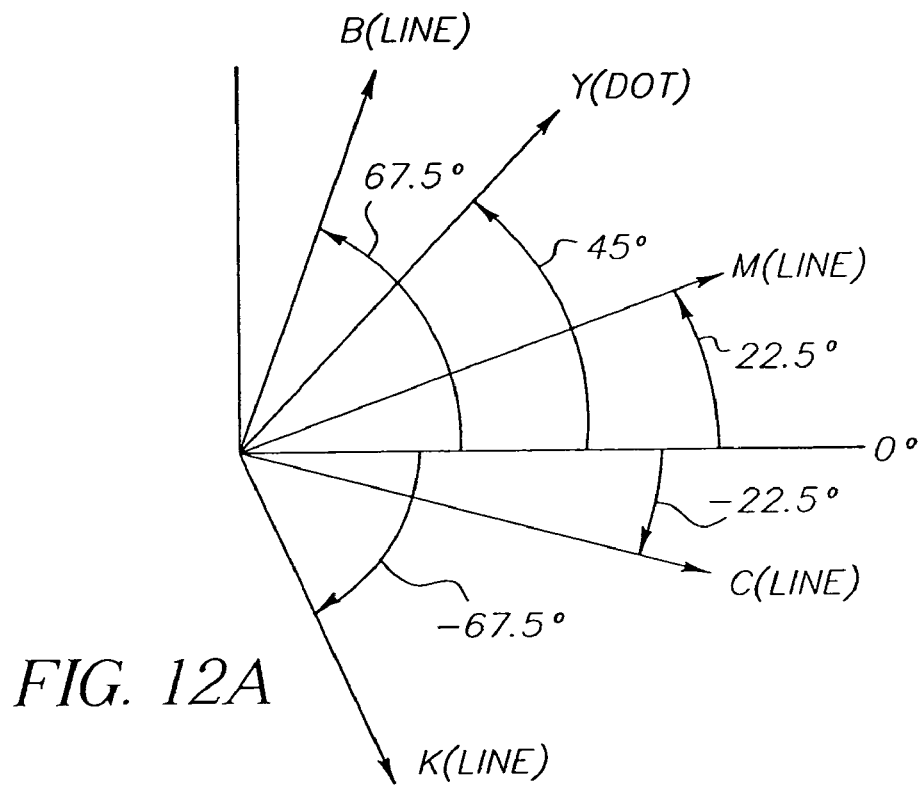
FIGS. 12A and 12B are diagrams each illustrating a representation of halftone screen angles and dot growth pattern types (dot or line) in a five color printing system in accordance with fourth and fifth embodiments of the invention.
Figure 12B:
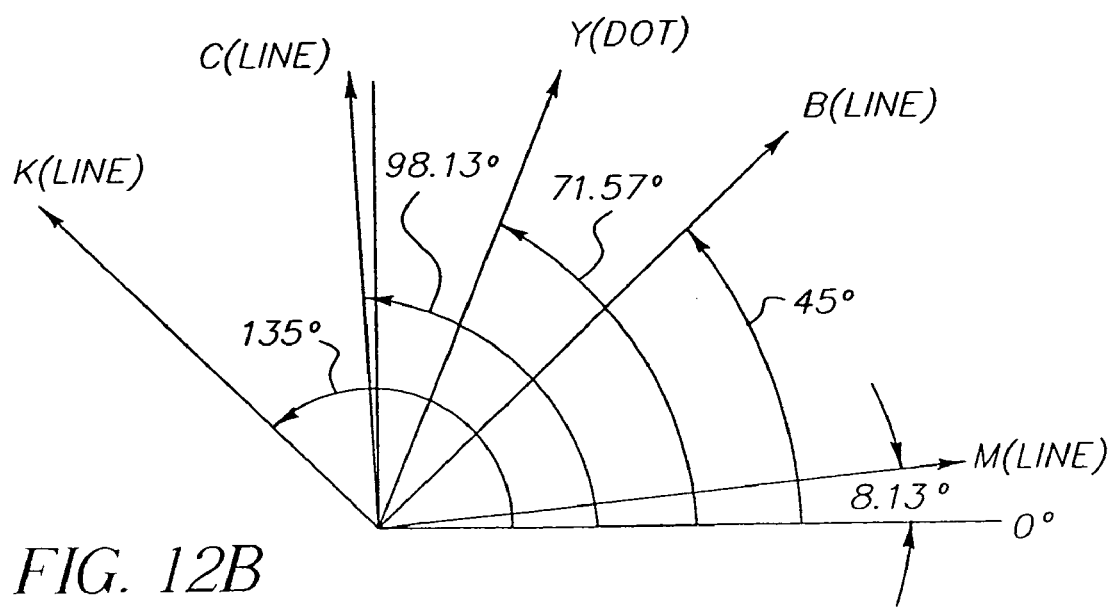

With reference now to FIGS. 12A and 12B there are illustrated fourth and fifth embodiments of the invention wherein five colors are accommodated. In each of these embodiments four of the colors, magenta, blue, cyan and black, each feature a line structure dot growth pattern in their respective halftone cells as illustrated, for example, in the FIG. 12A the screen angles are at approximately 22.5°, 67.5°, −22.5°, and −67.5° (more generally, 45° apart), the 5th screen, the yellow screen, being a dot screen at 45° with frequency 1.31 times that of the line screens, and for the embodiment of FIG. 12B the screen angles are at 8.13°, 45°, 98.13°, and 135°, the 5th screen, the yellow screen, being a dot screen at 71.57° with frequency 1.12 times that of the line screens. The yellow halftone cell is oriented at an angle midway between two of the halftone cells having the screens with the line structure dot growth pattern. For example as indicated in FIG. 12A the angle of the yellow halftone screen is midway between that of the angles of the magenta and blue halftone screens. In addition the yellow halftone screen features a dot structure dot growth pattern and a line frequency of at least and preferably more than 1.1 times the line frequency of the lowest halftone screen. It will be understood that even where the dot structure dot growth pattern is employed that the dots in each of the cells tend to line up along lines in accordance with the screen angle of the respective screen for that color. It will be further understood that the term "midway" implies being within plus or minus 1° from the actual midpoint. Typical screen frequencies range from 130 lines per inch (lpi) to 220 lpi.

Figure 13:
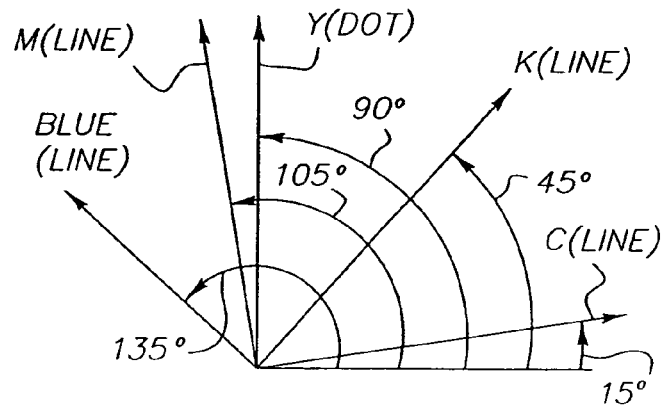
FIG. 13 is a diagram illustrating a representation of halftone screen angles and dot growth pattern types (dot or line) in a five color printing system in accordance with a six embodiment of the invention.

With reference now to FIG. 13 there is illustrated a sixth embodiment of the invention wherein five colors are accommodated. In this embodiment for the colors, cyan, black, magenta and blue, each feature a line structure dot growth pattern in their respective halftone cells and the halftone cells are of angles 15°, 45°, 105°, and 135° respectively. It will be noted that the line structures formed in the blue halftone cells will be perpendicular to that of the line structures formed in the black halftone cells. Furthermore the line structures formed in the magenta halftone cells will be perpendicular to the line structures formed in the cyan halftone cells. Therefore, objectionable moiré pattern artifacts will tend to be minimized. The yellow color is formed using halftone cells at a 90° degree angle and using a dot structure dot growth pattern. Since yellow is not a dominant color it tends not to be a major contributor to objectionable moiré artifact generation.

Figure 14:
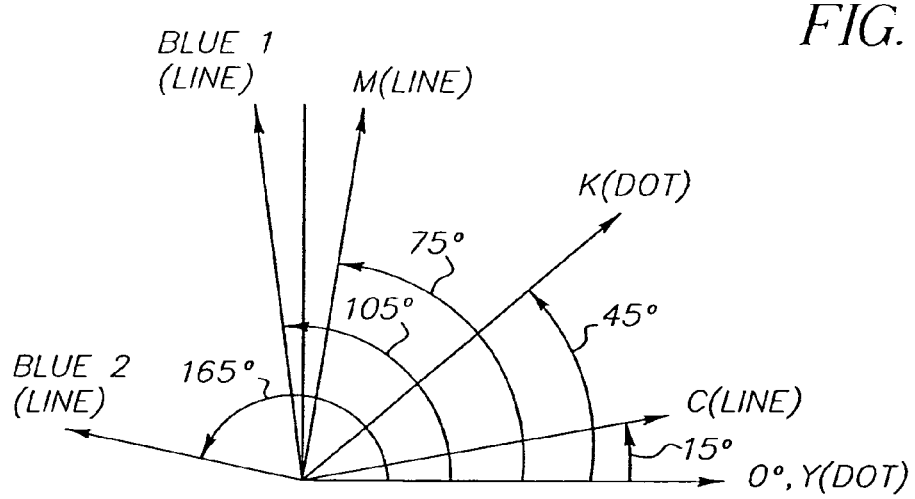
FIGS. 14 and 15 are diagrams each illustrating a representation of halftone screen angles and dot growth pattern types (dot or line) in a five color printing system in accordance with seventh and eighth embodiments of the invention.

With reference now to FIG. 14 there is illustrated a seventh embodiment of the invention wherein five colors are accommodated. The halftone screens for the yellow and black separations are situated at 0° and 45° respectively and each of these screens employs a dot structure dot growth pattern. The cyan and magenta color separation images have their respective halftone screens at angles of 15° and 75° respectively and each of these halftone screens employs a line structure dot growth pattern. A 60° line structure is thus formed by the cyan and magenta color separation images, and this 60° rosette, or diamond line structure is relatively pleasing. The blue color separation image is formed using two halftone screens, one being situated at 105° and the other at 165° to provide a 60° separation between the 2 screens. Both of these blue color separation halftone screens also employ a line structure.

Figure 16:
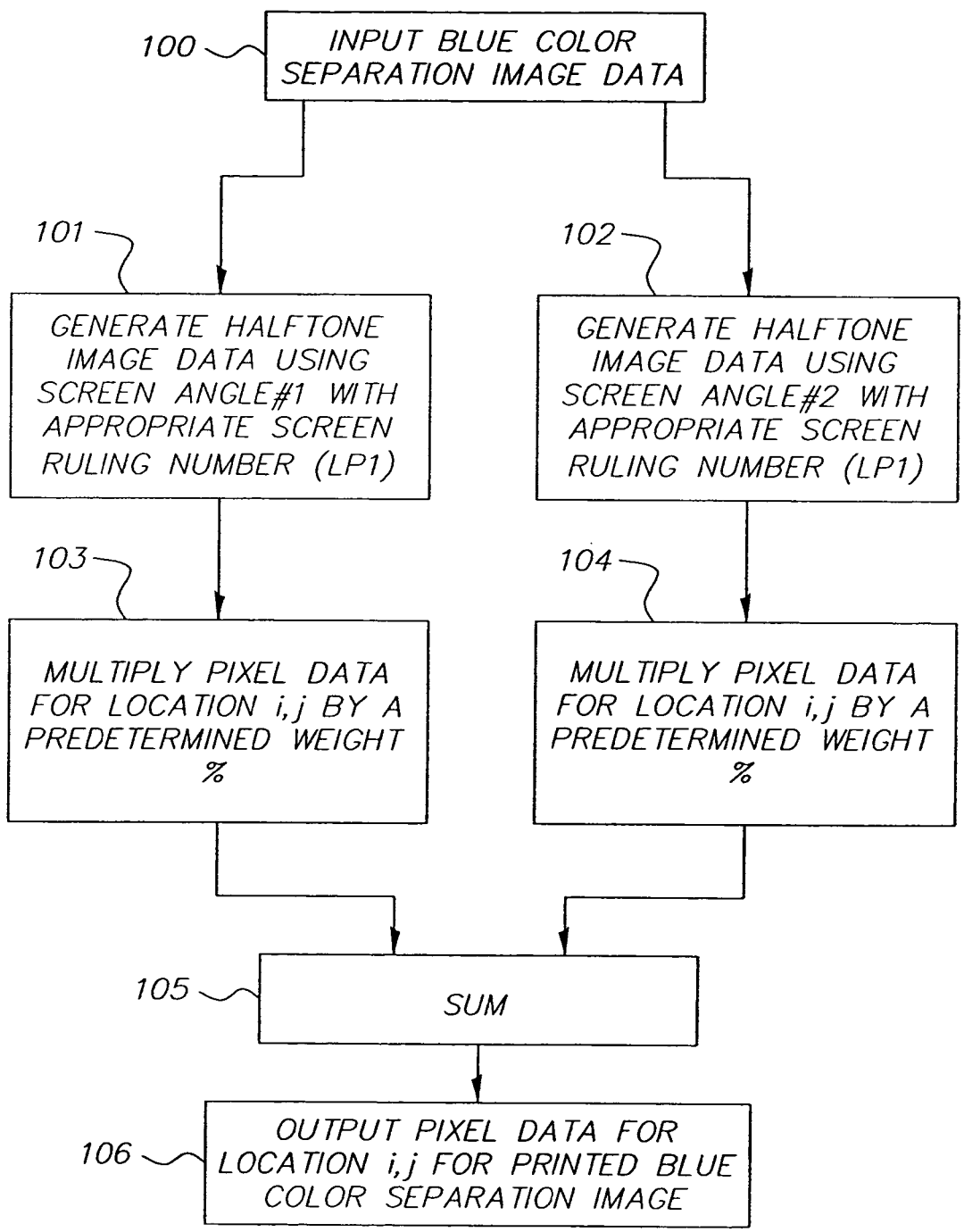
FIG. 16 is a flowchart of a process for creating a single hi-fi color separation image in a five color printing system of FIGS. 14 and 15.

With reference to the flowchart of FIG. 16 the actual image that is printed for the blue color separation is a composite sum of corresponding pixel locations in each of these two blue color separation screens. Thus as can be seen in the flowchart of FIG. 16 color image data of the blue color separation image is input from a color scanner, digital camera, memory or computer or generated from some other combination of colors and typically is continuous image information and may be subject to color correction and other corrections to make the image data color dependent on the characteristics of the printer, step 100. The corrected blue color separation image data is processed by the screen generator at each of two different halftone screen angles, steps 101, 102. To do this, threshold values are assigned with each screen and associated with each halftone cell and dependent upon line frequency. The incoming blue image data is compared with the threshold values to determine whether or not a dot is to be printed at a particular pixel location i,j (binary printing case) or to determine the gray level of the dot at a particular pixel location i,j (gray level printing case). The algorithmically developed gray value for each pixel location i,j is then multiplied by a predetermined weighting value, steps 103, 104, and then the weighted products are summed in step 105. The sum in step 105 represents the rendered pixel value to be sent to the printer for printing by that color module at the pixel location i,j on the receiver sheet, step 106. Further modification of the pixel value may be made for uniformity correction or otherwise as is well known in the art. The resulting image produced has an influence of both screens so that there are series of dots or line structures that appear to be printed along lines at one screen angle and other series of dots or line structures that appear to be printed along lines at the second screen angle. Alternatively, the single color separation merge may be separately processed at the different screen angles and printed separately on the receiver sheet to form the combined diamond structure or rosette structure in the single color.

Halftone cells comprising the halftone screens form, in response to the image data, a buildup of dots at various locations on each halftone screen wherein the dots appear to be arranged along lines having different respective angles which would be at 60° to each other because the halftone screens are developed at a 60° angle to each other. It will be noted that while each cell comprises plural pixel locations that it is the cell itself that is to be representative of the gray level to be printed at an area on the receiver member. Each halftone screen 101, 102 has a counterpart pixel location that would ordinarily be used to print a pixel at a pixel location i,j on the receiver. The counterpart pixel in each halftone screen is multiplied by a weighting factor associated with each screen and then the sum is taken and sent to the printer for printing at that pixel location i,j on the receiver member. The composite image thus formed for this blue color separation represents pixels arranged along two line directions that in effect present a rosette or diamond grid having a similar diamond structure to that shown with regard to the density ramp of FIG. 11 but being in only the one color blue.

Figure 17:
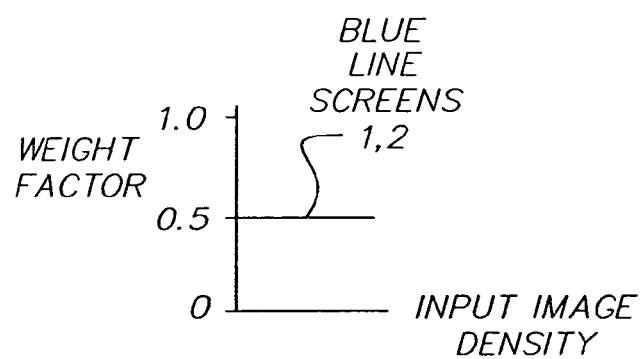
FIGS. 17 and 18 are graphs illustrating weighting factors that might be used in the process of FIG. 16.
Figure 18:
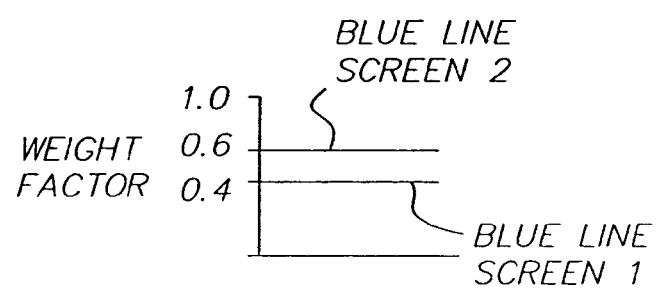

It has been found that this 60° diamond grid has a relatively pleasing appearance. The weights provided when forming the composite of the halftone screens 101, 102 will typically be 0.5 for each in the case of halftone screens each having a line structure dot growth pattern as may be seen in FIG. 17 and preferably each of these screens will be of the same screen frequency. However, this weighting factor may be adjusted in accordance with providing more weight to one than the other to emphasize one screen angle or screen frequency over the other, see the example illustrated in FIG. 18. For line structure dot growth pattern screens the weighting factor for each screen should be in the range of 0.4 to 0.6 wherein the sum of the weighting factors equals 1.0. While the processing of the blue color or hi-fi color separation image is preferred using two halftone screens at the aforesaid 60° angle between them and processing the color separation image using a line structure dot growth pattern for each of the two halftone screens, a range of suitable angles between the respective two halftone screens for processing a color separation image to form a diamond structure is 53° to 64°.

Figure 15:
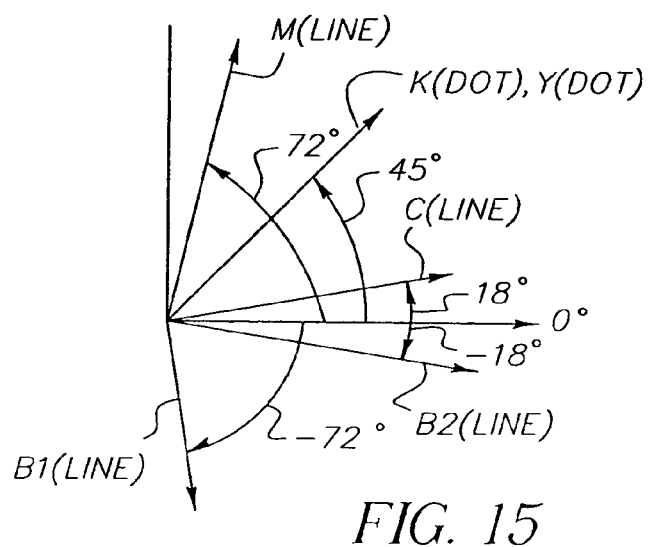

With reference to FIG. 15 there is illustrated an eighth embodiment of the invention wherein five colors are accommodated. The halftone screens of yellow and black are both situated at 45° and both of these screens employ a dot structure dot growth pattern. The cyan and magenta halftone screens are at 18° and 72° respectively and both of these screens employ a line structure dot growth pattern. The blue color separation image is formed using a composite of two halftone screens, one at −18° and the other at −72°, and in accordance with the process illustrated by the flowchart of FIG. 16 each using the line structure dot growth pattern to form the diamond line structure illustrated by FIGS. 10 and 11. Although the flowchart of FIG. 16 has been illustrated for use with a line structure dot growth pattern type of processing for a color separation image, it is also possible, as noted with more particularity in the cross-referenced application, to employ this process for use with a dot structure dot growth pattern type of processing for the color separation image.

There has thus been shown an improved printer and method of printing and method of encoding image data wherein color images may be printed with minimization of artifacts through representation of certain color separation images in a line structure dot growth pattern format within a halftone cell while color separation images of other colors are represented using a dot structure dot growth pattern within their respective halftone cells. In its broader aspects the invention contemplates that at least three halftone screen patterns for printing of at least three different colors may be provided for wherein two of the halftone screen patterns employ a similar pattern of growth of dot growth as either the growth of dots in accordance with a line structure dot growth pattern or the growth of dots in accordance with a dot structure dot growth pattern and wherein the third halftone screen pattern employs a pattern of dot growth different from that of the two halftone screen patterns. The dots formed by the various halftone screen patterns and placed on the receiver may be superimposed on each other at the same pixel location to form various shades of other colors.

The invention has been described with reference to the preferred embodiments. Obviously, modifications and alternatives will occur to others upon reading in understanding the preceding detailed description. For example, as noted above that while the creation of gray level dots in individual pixel locations has been described as the preferred embodiment the invention in its broader aspects also contemplates the use of binary pixels for forming the line structure dot growth patterns in a halftone cell and/or the dot structure dot growth patterns in a halftone cell. It is intended therefore that the invention be construed as including all such modifications and alternatives so far as they come within the scope of the appended claims or the equivalents thereof.

What is claimed is:

1. An apparatus for configuring image information for printing of an image having at least three different colors, comprising:
   a first halftone screen generator for generating information representing a first color separation image of the image by generating first halftone cells at a first predetermined halftone screen angle wherein pixels within the first halftone cell are oriented in a line structure with increasing cell density from first halftone cell to first halftone cell being identified by stronger line structures;
   a second halftone screen generator for generating information representing a second color separation image of the image by generating second halftone cells at a second predetermined halftone screen angle different from the first halftone screen angle and wherein pixels within the second halftone cell are represented in a line structure with increasing cell density from second halftone cell to second halftone cell being identified by stronger line structures, the line structures formed in the second halftone cells being at a different angle than the line structures formed in the first halftone cells; and
   a third halftone screen generator for generating information representing a third color separation image of the image by generating third halftone cells in accordance with a line structure dot growth pattern for each of the first halftone screen and second halftone screen of two different screen angles wherein pixels within a third halftone cell are represented by dots with increasing cell density from third halftone cell to third halftone cell being identified by stronger dot structures, the dot structures of the third halftone cells image being ordered along a series of parallel third lines and the series of parallel third lines being generated by a composite first halftone screen and second halftone screen that are formed of the first and second halftone cells.

2. The apparatus of claim 1 and wherein the colors of the first and second color separation images are selected from the group consisting of magenta, cyan, blue and black and the first and second colors are different in color from each other and from the third color.

3. The apparatus of claim 2 and further including a fourth halftone screen generator for generating information representing a fourth color separation image of the image by generating fourth halftone cells at a fourth predetermined halftone screen angle.

4. The apparatus of claim 3 and further including a fifth halftone screen generator for generating information representing a fifth color separation of the image by generating fifth halftone cells at a fifth predetermined halftone screen angle.

5. The apparatus of claim 1 and further including a fourth halftone screen generator for generating information representing a fourth color separation image of the image by generating fourth halftone cells at a fourth predetermined halftone screen angle.

6. The apparatus of claim 5 and further including a fifth halftone screen generator for generating information representing a fifth color separation of the image by generating fifth halftone cells at a fifth predetermined halftone screen angle.

7. The apparatus of claim 6 and wherein the first and second color separation images comprise blue and black, respectively, the third color separation image is cyan, the fourth color separation image is yellow and the fifth color separation is magenta.

8. The apparatus of claim 7, and wherein the line structures in the blue and black color separation images are perpendicular to each other.

9. An apparatus for configuring image information for printing of an image having at least three different colors, comprising:
   a first halftone screen generator for generating information representing a first color separation image of the image by generating first halftone cells at a first predetermined halftone screen angle wherein pixels within the first halftone cell are oriented in a line structure with increasing cell density from first halftone cell to first halftone cell being identified by stronger line structures;
   a second halftone screen generator for generating information representing a second color separation image of the image by generating second halftone cells at a second predetermined halftone screen angle different from the first halftone screen angle and wherein pixels within the second halftone cell are represented in a line structure with increasing cell density from second halftone cell to second halftone cell being identified by stronger line structures, the line structures formed in the second halftone cells being at a different angle than the line structures formed in the first halftone cells;
   a third halftone screen generator for generating information representing a third color separation image of the image by generating third halftone cells at a third predetermined halftone screen an e wherein pixels within a third halftone cell are represented by dots with increasing cell density from third halftone cell to third halftone cell being identified by stronger dot structures, the dot structures of the third halftone cells image being ordered along a series of parallel third lines and the series of parallel third lines being at a different angle than that of the line structures formed in the first and second halftone cells; and
   a fourth halftone screen generator for generating information representing a fourth color separation image of the image using a composite of halftone cell information from two different screen angles with processing of the fourth color separation image in accordance with a line structure dot growth pattern for each of the two different screen angles.

10. The apparatus of claim 6 and wherein the first and second color separation images comprise magenta and cyan, respectively, the third color separation image is black, the fourth color separation image is yellow and the fifth color separation image is blue.

11. The apparatus of claim 3 and wherein the first and second color separation images comprise magenta and cyan, respectively, the third color separation is black and The fourth color separation image is yellow.

12. The apparatus of claim 11 and wherein the yellow color separation image is formed of pixels within a halftone cell that are represented by dots with increasing cell density from halftone cell to halftone cell being identified by stronger dot structures grown in accordance with a dot structure dot growth pattern, the dot structures of the fourth halftone cells being ordered along a series of parallel fourth lines and the series of parallel fourth lines being at a different angle than that of the line structures formed in the first and second halftone cells.

13. The apparatus of claim 3 and wherein the series of parallel fourth lines are at a different angle than that of The series of parallel third lines.

14. The apparatus of claim 1 and wherein the line structures in the first and second halftone screens are perpendicular to each other.

15. A method for configuring image information for printing of an image having at least three different colors, comprising:
    generating information representing a first color separation image of the image using a first halftone screen generator, by generating first halftone cells at a first predetermined halftone screen angle wherein pixels within the first halftone cell are oriented in a line structure with increasing cell density from first halftone cell to first halftone cell being identified by stronger line structures;
    generating information representing a second color separation image of the image using a second halftone screen generator, by generating separation image of the image by generating second halftone cells at a second predetermined halftone screen angle different from the first halftone screen angle and wherein pixels within the second halftone cell are represented in a line structure with increasing cell density from second halftone cell to second halftone cell being identified by stronger line structures, the line structures formed in the second halftone cells being at a different angle than the line structures formed in the first halftone cells; and
    generating information representing a third color separation image of the image using a third halftone screen generator, by generating third halftone cells in accordance with a line structure dot growth pattern for each of the first halftone screen and second halftone screen of two different screen angles wherein pixels within a third halftone cell are represented by dots in accordance with a dot structure growth pattern with increasing cell density from third halftone cell to third halftone cell being identified by stronger dot structures, the dot structures of the third halftone cells image being ordered along a series of parallel third lines and the series of parallel third lines being generated by a composite first halftone screen and second halftone screen that are formed of the first and second halftone cells.

16. The method of claim 15 and wherein the line structures in the first halftone cell and that in the second halftone cell are perpendicular to each other.

17. The method of claim 16 and wherein image information is configured for at least five colors including cyan, magenta, yellow, black and blue.

18. The method of claim 15 and wherein the line structures in the first halftone cell and in the second halftone cell are at an angle of between 53° and 64° to each other.

19. The apparatus of claim 1 and wherein the third halftone screen cell is ordered along two series of crossed parallel lines and the series of crossed parallel lines are at an orthogonal angle to the line structures formed in the first and second halftone cells.

20. The apparatus of claim 1 wherein the line structures formed by the halftone cells with the line structure dot growth pattern are at an angle of between 53° and 64° to each other.

21. The apparatus of claim 4 wherein the first and second color separation images comprise cyan and magenta, respectively; the third color separation image is blue; the fourth color separation image is black; and the fifth color separation is yellow.

22. The apparatus of claim 4 wherein:
    the first, second, fourth, and fifth screen is formed with traditional color separation image comprise cyan, magenta, black, and yellow color of color screen of 15°, 75°, 45°, and 0° screen angles; and
    the third screen is a composite screen for the fifth color.

23. The apparatus of claim 4 wherein the fifth color separation image is blue.

24. The apparatus of claim 1 and wherein the line structures formed by the halftone cells with the line structure dot growth pattern are at an angle of between 53° and 64° to each other.

* * * * *

UNITED STATES PATENT AND TRADEMARK OFFICE
CERTIFICATE OF CORRECTION

PATENT NO. : 7,508,549 B2
APPLICATION NO. : 10/837518
DATED : March 24, 2009
INVENTOR(S) : Hwai-Tzuu Tai et al.

It is certified that error appears in the above-identified patent and that said Letters Patent is hereby corrected as shown below:

| | |
|---|---|
| Column 16, line 22 | In Claim 8, delete "7," and insert -- 7 --, therefor. |
| Column 16, line 50 (Approx.) | In Claim 9, delete "an e" and insert -- angle --, therefor. |
| Column 17, line 6 | In Claim 11, delete "The" and insert -- the --, therefor. |
| Column 17, line 19 | In Claim 13, delete "The" and insert -- the --, therefor. |

Signed and Sealed this

Fifth Day of January, 2010

David J. Kappos
*Director of the United States Patent and Trademark Office*